April 4, 1967 H. K. ST. CLAIR 3,312,962
APPARATUS FOR MAGNETICALLY RECORDING DATA AT A RANDOM LOCATION
Original Filed March 25, 1957 2 Sheets-Sheet 1

INVENTOR.
HAL K. ST. CLAIR
BY John B. Clark
ATTORNEY

United States Patent Office 3,312,962

Patented Apr. 4, 1967

3,312,962

APPARATUS FOR MAGNETICALLY RECORDING DATA AT A RANDOM LOCATION

Hal K. St. Clair, Los Gatos, Calif., assignor to International Business Machines Corporation, New York, N.Y., a corporation of New York Continuation of application Ser. No. 648,358, Mar. 25, 1957. This application Nov. 26, 1962, Ser. No. 243,697
4 Claims. (Cl. 340—174.1)

The present invention relates generally to storage devices and, more particularly, to magnetic storage devices wherein data is stored in the form of magnetized spots along a circular track of a magnetic recording medium. The present application is a continuation of my copending application Serial No. 648, 358, filed March 25, 1957, now abandoned.

Conventionally, data is recorded on or read from a magnetic recording medium under the control of timing signals or the like, which signals are synchronized with the movement of the recording medium. An additional control signal is usually provided to indicate the beginning of a record for controlling the initiation of the reading or writing operation. This control signal is referred to as a "reference mark," and during either reading or writing operation is prevented until the reference mark is generated. Under these conditions there is a loss of time on practically each read/write operation since it is necessary to wait until the reference mark occurs before the operation can be initiated. This loss averages approximately one-half the time it takes to scan the magnetic track.

The present invention is directed to a method and means for decreasing the time for writing by eliminating the reference mark and the associated time delay mentioned above, and to this end the write operation is initiated when desired regardless of the circumferential orientation of the magnetic track or of the data previously recorded on that track. The recording operation is initiated by an erase phase in which any data previously recorded on the track and passing under the transducer is erased or removed for creating a gap free of magnetic signals. After a predetermined length of the track has been erased corresponding approximately to a predetermined number of bit positions, data to be stored is recorded on the track serially by bit. As the latter portion of the data is delivered, it overlaps and is recorded in the initial portion of the previously erased gap. The last data recorded indicates the end of that data and is physically located along the circumference of the track at a suitable distance from the initially recorded data. In the present embodiment a signal-free gap of approximately 320 bit positions is provided between the last digit and the first digit.

From the above it can be seen that recording on any track may be accomplished at random without waiting for any synchronization signal or other reference mark which is timed to appear at some specific point along the track. Random recording according to this method results in time saving on each recording operation, which saving can amount to the time necessary for scanning the complete track. Thus, the recording of data occurs at random without regard to any reference mark or other synchronization pulse.

It is one of the objects of the present invention to provide an improved storage device which provides an average reduction in the time required for recording data.

It is another object of the invention to provide a storage device having a circular track for storing data written at random along the track.

A further object of the invention is to provide a storage device having several circular storage tracks in which corresponding digit positions of the recorded data may be circumferentially displaced from track to track.

Another object of the invention is to provide a storage device having data storage tracks in which synchronization of some point thereon with the data to be recorded is unnecessary.

Still another object of the invention is to provide a magnetic storage device for recording data on a circular track which has no specific circumferential location for receiving the initial characters of the data during a recording operation.

A still further object is to provide a magnetic storage device which erases a portion of the track to be recorded upon prior to the delivery of the data to be recorded.

Still a further object of the invention is to provide a magnetic storage device in which data is recorded on circular tracks wherein a signal-free space is provided between the last and first bit positions of the data recorded on the track.

It is yet another object of the invention to provide a magnetic storage device having rotating data storage tracks, which eliminates the synchronizing pulse generating means normally associated with a precise location on the rotating tracks.

Other objects of the invention will be pointed out in the following description and claims and illustrated in the accompanying drawings, which disclose, by way of example, the principle of the invention and the best mode which has been contemplated of applying that principle.

Figure 1:
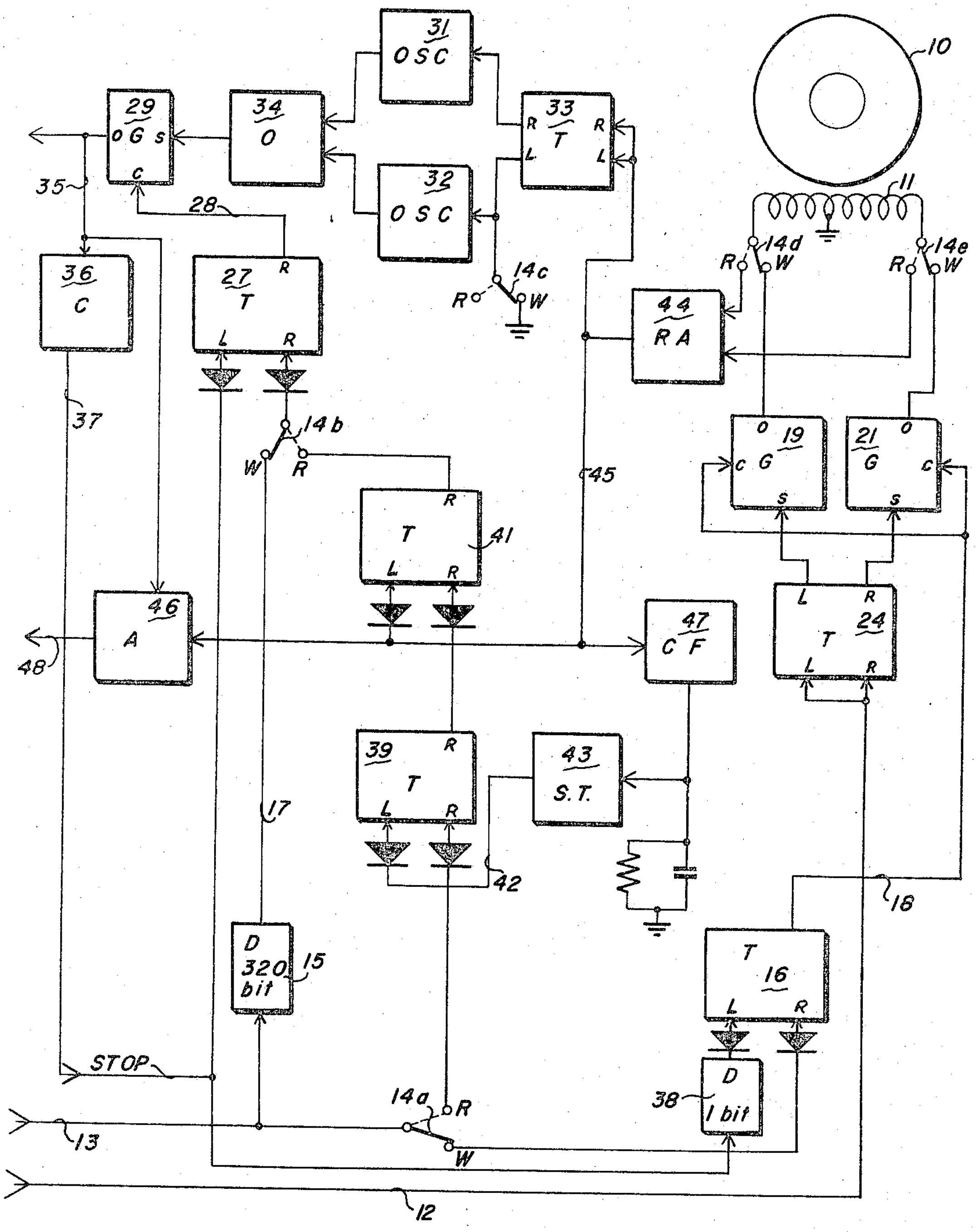
FIG. 1 is a block diagram of a circuit for reading and recording data according to the present invention.
Figure 2:
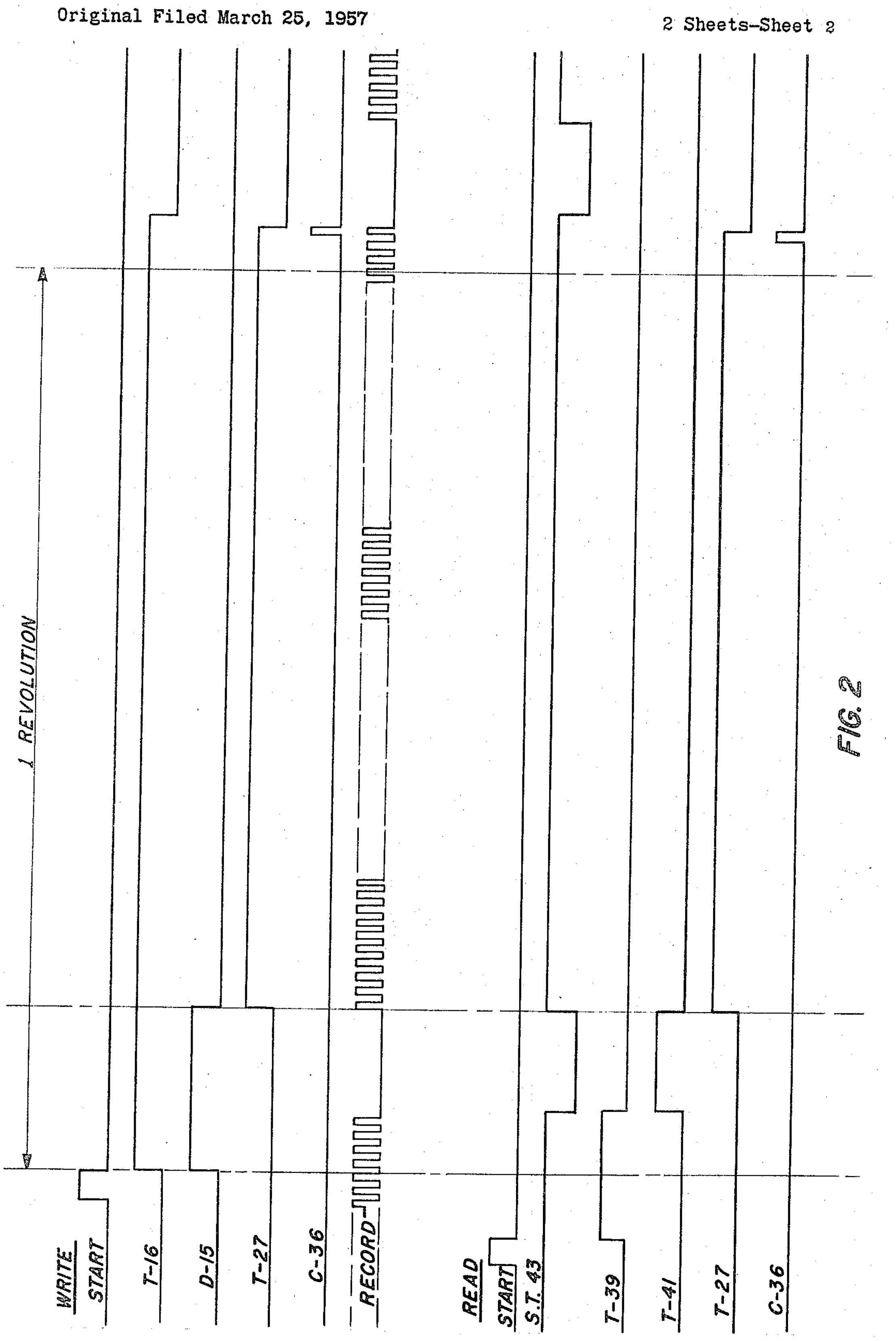
FIG. 2 is a timing diagram for illustrating the operation of the circuitry shown in FIG. 1.

In the drawing the various electronic devices are shown merely as blocks, and since the circuitry represented by these blocks is well known in the art, a detailed description thereof is not given herein. It should be noted, however, that each block is marked according to its function, i.e., an oscillator is identified by the letters "Osc," an "or" circuit is indicated by an "O," and a trigger is indicated by a "T." etc.

Referring now to FIG. 1, there is shown a circular magnetic recording track 10 which may be one of several circular tracks provided around the cylindrical surface of a rotating drum or which may be one of several concentric tracks provided on the face of a rotating disc. The winding of a single magnetic transducer is shown for cooperating with the track 10; however, it will be clear that with the provision of suitable switching circuitry the structure shown in FIG. 1 may be arranged to cooperate with any number of such transducers.

For demonstrating the operation of the invention, it is assumed herein that the data to be recorded on the track 10 is stored in a buffer storage such as the core buffer shown and described in the copending application Serial No. 565,293, filed January 24, 1956, in the name of John W. Haanstra et al., now U.S. Patent 3,026,036, which data is entered on a line 12 for recording on the track 10, as will be described. It will be understood, however, that the invention is not to be limited to use in connection with this type of buffer storage since many methods of entering data on the line 12 will be obvious to those skilled in the art. When data is to be transferred to the track 10, a start signal is entered on a line 13. This signal connects via the line 13 to the input of a delay circuit 15, such as single-shot multivibrator, as well as to the armature 14*a* of a "read/write" switch 14. During the write operation the switch 14 is in the *w* position and the line 13 connects to the R input tap of a trigger 16. During the write operation, therefore, the start signal raises the potential of line 17 connected to the output of the delay, which line drops after a period of time determined by the delay. Additionally, the trigger 16 is operated to raise the potential of a line 18 connected to the R output tap thereof.

The line 18 connects to the control tap of each of two gate circuits 19 and 21 for controlling the passage of write signals to the transducer winding 11. Write signals are generated by a trigger 24 and when the line 18 is high, these signals pass through one or the other of the gates 19 and 21 to the winding 11 since the L and R output taps of the trigger 24 connect to the signal taps of the gates 19 and 21, respectively, and since the output taps of the gates 19 and 21 connect through the armatures 14*d* and 14*e* of the switch 14 to opposite sides of the winding 11.

In the present embodiment data is entered on the line 12 in the form of discrete pulses when binary 1's are to be recorded, binary 0's being identified by the lack of such pulses. Thus, 1's are recorded by operating the trigger 24, thereby reversing the polarity of the flux generated by the winding 11, and 0's are recorded if the trigger 24 is not operated. Regardless of the condition of the trigger 24 initially, therefore, the transducer is controlled to erase previously recorded data by writing 0's when the line 18 rises. Thus, the start signal entered on the line 13 causes an erase operation, which operation is initiated at random according to the occurrence of the start signal.

In the present embodiment of the delay provided by the delay unit 15 is in the neighborhood of 320 bits although any convenient delay may be utilized, as will become obvious. Thus, the line 17 rises with the start signal and drops after approximately 320 bits. The line 17 connects through the *w* contacts and armature 14*b* of the switch 14 to the R input tap of a trigger 27, and when the line 17 drops, the trigger 27 is operated to raise the potential of a line 28 connected to the R output tap thereof. The line 28 connects to the control tap of a gate 29 for controlling the passage of clock pulses therethrough, which pulses are generated by one of two oscillators 31 and 32 according to the condition of a trigger 33. The output of each oscillator 31 and 32 connects through an "or" circuit 34 to the signal tap of the gate 29. The oscillators 31 and 32, the trigger 33 and the "or circuit 34 comprise the timing circuitry of the invention, and this circuitry operates in the manner taught in the copending application Serial No. 537,260, filed September 28, 1955, in the name of Leonard D. Seader, now U.S. Patent 2,864,078. During the write operation the armature 14*c* of the switch 14 connects the input of the oscillator 32 to ground, thereby disabling the oscillator 32 and rendering the oscillator 31 operative for generating clock pulses. Thus, during the write operation clock pulses generated by the oscillator 31 pass through the "or" circuit 34, and after the delay provided by the unit 15 these pulses are fed onto a line 35 connected to the output tap of the gate 29. The pulses taken from the line 35 are utilized to control the entry of the data to be recorded onto the line 12, and the case where the data is stored in a core buffer such as that described in the aforementioned copending application Serial No. 565,293, these clock pulses are utilized to drive the buffer for entering the data therein serially by bit onto the line 12 for operating the trigger 24 accordingly. It should be noted in this connection that means are provided for providing at least the first character of the data to be recorded with a so-called "space" bit which is the first bit in the first binary coded character to be recorded.

The clock pulses connect via the line 35 to the input of a counter 36. Assuming, for example, that the track 10 is approximately 4160 bits in length for recording 4000 bit records, the counter 36 is arranged to count to 4000, at the end of which time a stop pulse is generated thereby and is entered onto a line 37 for terminating the write operation. Thus, after the 4000th bit has been recorded, the line 37 drops. This line connects to the L input tap of the trigger 27 as well as to the input of a 1-bit delay 38, the output of which connects to the L input tap of the trigger 16. Thus, 4000 bit times after the trigger 27 is operated to open the gate 29, it is again operated to close this gate to prevent the passage of additional clock pulses therethrough. Additionally, the delay 38 is operated and after a 1-bit delay the trigger 16 is again operated, thereby lowering the potential of the line 18 once more to prevent further erasing or writing.

It should now be clear that when it is desired to write on the track 10, the switch 14 being is the *w* position, the start signal causes the winding 11 of the transducer to be energized for erasing any previously recorded data as well as for operating the delay 15. After approximately 320 bits the line 17 drops, causing the gate 29 to pass clock pulses to the line 35. These pulses control the entry of data onto the line 12 for operating the trigger 24 in accordance therewith, the first operation of this trigger being brought about by the space bit which precedes the data. After the data has been recorded, the final portion thereof having been recorded in the first part of the erased gap, a signal from the counter 36 operates the trigger 27 to close the gate 29 and, additionally, operates the trigger 16 to close the gates 19 and 21 for deenergizing the winding 11.

To read the data recorded in the manner described above, the switch 14 is placed in the *r* position, thereby transferring its *a*, *b*, *c*, *d* and *e* armatures to the dotted line positions shown in FIG. 1. The start signal is again entered on the line 13, and this signal is now arranged to operate a trigger 39 since the line 13 connects to the R input tap thereof through the armature 14*a* when the switch 14 is in the *r* position, and when operated, the R output tap thereof rises. This tap connects to the R input tap of a trigger 41 and when the R output tap of the trigger 39 drops, the trigger 41 is operated to raise the potential of the R output tap of the trigger 41. This occurs when the L input tap of the trigger 39 drops, which input connects via a line 42 to the output of a Schmidt trigger 43.

It will be noted that the transducer winding 11 connects across the inputs of a read amplifier 44 when the switch 14 is in the *r* position, and signals sensed by the winding 11 are amplified by the amplifier 44 and are entered onto a line 45. The line 45 connects to both input taps of the trigger 33 as well as to one input of an "and" circuit 46 and to the input of a cathode follower 47. The read signal taken from the line 45 is differentiated in the cathode circuit of the cathode follower 47 and is applied to the input of the Schmidt trigger 43. The Schmidt trigger 43 is arranged to sense the gap in the recorded data, and when no signals are present at the output of the cathode follower 47, the Schmidt trigger 43 is operated.

As mentioned above, the output of the Schmidt trigger 43 connects to the L input tap of the trigger 39 via the line 42, and when the gap is sensed, the L input tap of the trigger 39 drops, thereby operating this trigger to cause the R output tap thereof to drop. This operates the trigger 41, thereby raising the R output tap thereof, which tap connects to the *r* terminal of the *b* section of the switch 14. Since the switch 14 is in the *r* position, the R output tap of the trigger 41 connects to the R input tap of the trigger 27, and when the R output tap of the trigger 41 drops, the trigger 27 is operated to open the gate 29, as described earlier. This occurs when the space bit is sensed, i.e., when the first bit after the gap is sensed. The space bit, it will be recalled, signifies the beginning of the recorded data. Thus, the trigger 41 and the trigger 27 are both operated by the space bit, thereby raising the line 28 and opening the gate 29 to permit the passage of clock pulses both to the counter 36 and to the second input of the "and" circuit 46 at this time. The read signal is mixed with clock pulses in the "and" circuit 46 and is taken from the output tap thereof for use as may be desired. As explained above in connection with the write operation, the counter 36 determines the end of the recorded data and on the 4000th clock pulse to pass through the gate 29 the line 37 drops. This line connects to the L input tap of the trigger 27, thereby operating this trigger to lower the potential of the line 28 for closing the gate 29 to prevent the passage of further clock pulses therethrough, thereby preventing further signals from going through the "and" circuit 46.

It should be noted that on the read operation the armature 14c of the switch 14 connects to the *r* terminal thereof, thereby disconnecting the input of the oscillator 32 from ground, and under these conditions each data signal taken from the line 45 operates the trigger 33 as described in the aforementioned copending application Serial No. 537,260, for alternately rendering the oscillators 31 and 32 operative. Thus, each bit of recorded data acts to render the oscillators 31 and 32 operative alternately for continuously rephasing the clock pulses with the data signals as taught in the above mentioned application.

It is to be understood that various additional timing pulses, switching, and the like, as well as other electronic components not pertaining to the logic of the invention, are not shown but may be required to operate the device in an actual installation. However, these additional elements form no portion of the invention and, if shown, would merely tend to complicate both the description and drawings without aiding in the understanding of the invention. Therefore, for the sake of simplification all elements not bearing directly on the invention have been eliminated.

From the above, it can be seen that a magnetic storage system has been provided wherein the recording of data is accomplished on a circular track in a random manner along the circumference without regard to any particular home position or reference mark and that this random recording occurs each time data is recorded on the track and may vary from track to track. With reading and recording taking place at random at any circumferential point along the circular track, the requirement of precise timing with some position on the track has been eliminated. This results in increased overall recording speeds and yields a considerable saving in processing time.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a device for storing data in a plurality of digit positions recorded thereat to provide coded character representations the combination of:

a rotatable storage medium having at least one data storage track for storing a plurality of digits in each track and
  wherein a gap is provided between the recorded positions of the first and last digits,
erasing and recording means for cooperating with said tracks, means responsive to the initiation of a recording operation for energizing said erasing and recording means for erasing a predetermined length of a selected track to remove previously recorded data thereat,
said erasing operation occurring at random on the track independently of any data previously recorded thereon, and
means for delivering the digits of data to the erase and recording means a fixed predetermined time and multidigit interval after said erasing operation started for storage on the track, said last digit recorded being recorded in a previously erased portion of the track.

2. In a device for storing data in digit positions recorded thereat to provide coded character representations, the combination of:

a data storage medium,
a transducer associated with said storage medium,
means for relatively moving said storage medium and transducer to describe a circular path along which digits of data are recorded,
means dependent upon a control signal for initiating an erasing operation for erasing any previously recorded data passing by said transducer starting at any random location along the path, and
means operable a fixed predetermined time and multidigit interval after initiation of said erasing operation for delivering the digits of data to be recorded to said transducer independently of the starting position of the previously recorded data, at least the last digit recorded being recorded in a section of the initially erased portion to provide a data-free space between the first and last recorded digit positions.

3. In a device for storing data in a plurality of digit positions recorded thereat to provide coded character representations, the combination of:

a rotatable storage medium having at least one endless data storage track for storing a plurality of digits forming a record of a length less than that of the storage track and
  wherein a gap equal to a predetermined number of digits is always provided between the recorded positions of the first and last digits of data recorded on the track,
    the gap being for the purpose of indicating the position of the data record,
erasing and recording means cooperating with said track, means responsive to the initiation of a recording operation for energizing said erasing and recording means for erasing a predetermined multidigit portion of a length substantially less than the length of the record of said track to remove previously recorded data thereat,
  said erasing operation always automatically occurring in response to random initiation of a recording operation on the track independently of any data previously recorded thereon, and
means for delivering a predetermined number of digits to the erase and recording means for storage on the track a fixed predetermined time and multidigit interval after the erasing operation has started,
  the last digits of the predetermined number of digits delivered being recorded in a previously erased portion of the track while still leaving said predetermined multidigit gap between the first and last digits on the endless storage track.

4. A device for storing data as defined in claim 3 further comprising:

means for conditioning the device for a read operation,
means automatically responsive to a start signal to sense the predetermined gap between the first and last digit, and
means responsive to said gap sensing means to initiate the reading of said record.

References Cited by the Examiner

UNITED STATES PATENTS 2,919,431 12/1959 Blackford ---------- 340—174.1

JAMES W. MOFFITT, *Acting Primary Examiner.*

BERNARD KONICK, *Examiner.*

A. I. NEUSTADT, *Assistant Examiner.*